United States Patent
Jeong

(10) Patent No.: US 12,489,985 B2
(45) Date of Patent: Dec. 2, 2025

(54) IMAGE PROCESSING METHOD AND ELECTRONIC DEVICE THEREFOR

(71) Applicant: Samsung Electronics Co., Ltd., Suwon-si (KR)

(72) Inventor: Taekseong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 18/512,539

(22) Filed: Nov. 17, 2023

(65) Prior Publication Data

US 2024/0089609 A1  Mar. 14, 2024

Related U.S. Application Data

(63) Continuation of application No. PCT/KR2022/007168, filed on May 19, 2022.

(30) Foreign Application Priority Data

May 20, 2021 (KR) .................. 10-2021-0064993

(51) Int. Cl.
*H04N 23/741* (2023.01)
*G06T 7/246* (2017.01)
(Continued)

(52) U.S. Cl.
CPC ........... *H04N 23/741* (2023.01); *G06T 7/248* (2017.01); *G06V 40/172* (2022.01); *H04N 5/265* (2013.01);
(Continued)

(58) Field of Classification Search
None
See application file for complete search history.

(56) References Cited

U.S. PATENT DOCUMENTS 5,107,780 A  4/1992  Braun
5,144,448 A  9/1992  Hornbaker, III et al.
(Continued)

FOREIGN PATENT DOCUMENTS

EP  2 286 371 B1  10/2012
EP  2 377 071 B1  2/2015
(Continued)

OTHER PUBLICATIONS

Korean Office Action dated Jul. 22, 2025 for KR Application No. 10-2021-0064993.

*Primary Examiner* — Eileen M Adams
(74) *Attorney, Agent, or Firm* — Nixon & Vanderhye P.C.

(57) ABSTRACT

An electronic device may include: a camera; a display; and at least one processor electrically connected to the camera and the display. The at least one processor may: display, on the display, as a preview image, an image acquired by driving the camera; determine a first region in the preview image to be a main region; by varying the field of view of the camera, acquire, according to a predetermined sequence, a plurality of images corresponding to the respective plurality of fields of view; acquire a first image for the first region by using the camera; and generate a result image on the basis of the acquired plurality of images and first image, wherein at least a portion of the first image may overlap with at least one of the plurality of images. Other various embodiments are possible as identified in the specification.

20 Claims, 10 Drawing Sheets

(51) Int. Cl.
  *G06V 40/16* (2022.01)
  *H04N 5/265* (2006.01)
  *H04N 23/611* (2023.01)
  *H04N 23/62* (2023.01)
  *H04N 23/63* (2023.01)
  *H04N 23/71* (2023.01)
  *H04N 23/72* (2023.01)
  *H04N 23/73* (2023.01)

(52) U.S. Cl.
  CPC .......... *H04N 23/611* (2023.01); *H04N 23/62* (2023.01); *H04N 23/632* (2023.01); *H04N 23/635* (2023.01); *H04N 23/71* (2023.01); *H04N 23/72* (2023.01); *H04N 23/73* (2023.01); *G06T 2207/10144* (2013.01); *G06T 2207/20104* (2013.01); *G06T 2207/20212* (2013.01)

(56) References Cited

U.S. PATENT DOCUMENTS

| | | |
|---|---|---|
| 5,258,246 A | 11/1993 | Berger et al. |
| 5,532,845 A | 7/1996 | Gusmano |
| 5,953,124 A | 9/1999 | Deck |
| 6,140,021 A | 10/2000 | Nakasuji et al. |
| 6,449,048 B1 | 9/2002 | Olszak |
| 6,583,854 B1 | 6/2003 | Hazama et al. |
| 6,590,218 B1 | 7/2003 | Suzuki |
| 6,822,768 B1 | 11/2004 | Mccoy |
| 7,057,741 B1 | 6/2006 | Mueller et al. |
| 7,511,731 B2 | 3/2009 | Katayama et al. |
| 8,542,289 B1 | 9/2013 | Mcclatchie |
| 9,292,739 B1 | 3/2016 | Gray et al. |
| 2001/0031078 A1 | 10/2001 | Doane |
| 2002/0070277 A1 | 6/2002 | Hannigan |
| 2003/0038992 A1 | 2/2003 | Emmenegger et al. |
| 2003/0136922 A1 | 7/2003 | Suzuki |
| 2003/0202233 A1 | 10/2003 | Sandstrom |
| 2004/0036846 A1 | 2/2004 | Nishi |
| 2004/0233274 A1 | 11/2004 | Uyttendaele et al. |
| 2005/0104902 A1 | 5/2005 | Zhang et al. |
| 2005/0110869 A1 | 5/2005 | Tillotson |
| 2006/0006067 A1 | 1/2006 | Unger |
| 2006/0126076 A1 | 6/2006 | Mueller et al. |
| 2007/0023692 A1 | 2/2007 | Stenger |
| 2007/0115462 A1 | 5/2007 | Daul et al. |
| 2008/0043114 A1 | 2/2008 | Sung et al. |
| 2008/0229579 A1 | 9/2008 | Pickens |
| 2008/0278732 A1 | 11/2008 | Mueller et al. |
| 2009/0015674 A1 | 1/2009 | Alley et al. |
| 2009/0028423 A1 | 1/2009 | Sandstrom et al. |
| 2009/0127326 A1 | 5/2009 | Rudeen |
| 2009/0303268 A1 | 12/2009 | Smythies |
| 2009/0310132 A1 | 12/2009 | Bennett et al. |
| 2010/0163628 A1 | 7/2010 | Olmstead |
| 2011/0267594 A1 | 11/2011 | Kim et al. |
| 2012/0050074 A1 | 3/2012 | Bechtel et al. |
| 2012/0147377 A1 | 6/2012 | Barbara et al. |
| 2012/0162483 A1 | 6/2012 | Sutton et al. |
| 2012/0206620 A1 | 8/2012 | Findlay et al. |
| 2012/0257085 A1 | 10/2012 | Matsumoto et al. |
| 2013/0126729 A1 | 5/2013 | Own et al. |
| 2013/0301001 A1 | 11/2013 | Carnevale |
| 2014/0022352 A1 | 1/2014 | Fisker et al. |
| 2014/0226858 A1 | 8/2014 | Kang et al. |
| 2014/0231650 A1 | 8/2014 | Streuber et al. |
| 2014/0247974 A1 | 9/2014 | Figg et al. |
| 2014/0333937 A1 | 11/2014 | Mueller et al. |
| 2014/0348399 A1 * | 11/2014 | Kuo ................ G06V 40/172 382/118 |
| 2015/0054922 A1 | 2/2015 | Fisker et al. |
| 2015/0105123 A1 | 4/2015 | Song et al. |
| 2015/0230577 A1 | 8/2015 | Godshaw et al. |
| 2015/0268333 A1 | 9/2015 | Schneider et al. |
| 2015/0348749 A1 | 12/2015 | Lang et al. |
| 2016/0166142 A1 | 6/2016 | Kobayashi |
| 2016/0173771 A1 | 6/2016 | Bernal et al. |
| 2016/0259971 A1 | 9/2016 | Kim et al. |
| 2017/0026565 A1 | 1/2017 | Hong et al. |
| 2017/0160536 A1 | 6/2017 | Figg et al. |
| 2017/0230528 A1 | 8/2017 | Colagrande et al. |
| 2018/0085002 A1 | 3/2018 | Glinec et al. |
| 2018/0170071 A1 | 6/2018 | Albert et al. |
| 2018/0292638 A1 | 10/2018 | Bredno et al. |
| 2019/0137894 A1 | 5/2019 | Chen |
| 2019/0191141 A1 | 6/2019 | Fisker et al. |
| 2019/0230293 A1 | 7/2019 | Jung et al. |
| 2019/0356853 A1 * | 11/2019 | Lee ................ H04N 23/667 |
| 2020/0113413 A1 | 4/2020 | Hayashi |
| 2020/0344411 A1 * | 10/2020 | Cragg ................ H04N 23/64 |
| 2021/0304471 A1 * | 9/2021 | Mitsumoto ............ G06T 11/60 |

FOREIGN PATENT DOCUMENTS

| | | |
|---|---|---|
| EP | 3 335 893 A1 | 6/2018 |
| EP | 2 956 734 B1 | 5/2020 |
| JP | 4266737 | 2/2005 |
| JP | 5204979 B2 | 9/2007 |
| JP | 4716266 B2 | 9/2008 |
| JP | 2012-222541 A | 11/2012 |
| JP | 2014-066958 A | 4/2014 |
| JP | 2015-29865 A | 2/2015 |
| JP | 2017-143390 A | 8/2017 |
| JP | 2019-4978 | 5/2020 |
| KR | 2009-0125602 A | 12/2009 |
| KR | 2014-0102443 A | 8/2014 |
| KR | 2015-0042574 | 4/2015 |
| KR | 2017-0010588 A | 2/2017 |
| KR | 2018-0031239 A | 3/2018 |
| WO | WO 97-26619 A1 | 7/1997 |
| WO | WO00-67195 | 11/2000 |
| WO | WO 02-090887 A2 | 11/2002 |
| WO | WO 2005-121864 A2 | 12/2005 |
| WO | WO 2006-031537 A2 | 3/2006 |
| WO | WO 2008-129421 A1 | 10/2008 |
| WO | WO 2009-067552 A2 | 5/2009 |
| WO | WO 2009-094489 A1 | 7/2009 |
| WO | WO 2009-148495 A1 | 12/2009 |
| WO | WO 2010-005571 A2 | 1/2010 |
| WO | WO 2010-049738 A1 | 5/2010 |
| WO | WO 2011-106578 A2 | 9/2011 |
| WO | WO 2012-048173 A2 | 4/2012 |
| WO | WO 2012-083968 A1 | 6/2012 |
| WO | WO 2014-085911 A1 | 6/2014 |
| WO | WO 2014-126620 A1 | 8/2014 |
| WO | WO 2015-052410 A1 | 4/2015 |
| WO | WO 2015-155406 A1 | 10/2015 |
| WO | WO 2016-063231 A1 | 4/2016 |
| WO | WO 2016-081567 A1 | 5/2016 |
| WO | WO 2017-102827 A1 | 6/2017 |
| WO | WO 2017-109175 A1 | 6/2017 |
| WO | WO 2017-195034 A1 | 11/2017 |
| WO | WO 2018-026951 A1 | 2/2018 |
| WO | WO 2018-112721 A1 | 6/2018 |
| WO | WO 2020-093231 A1 | 5/2020 |
| WO | WO 2020-118619 A1 | 6/2020 |
| WO | WO 2020-181465 A1 | 9/2020 |
| WO | WO 2010-075581 A2 | 7/2021 |

* cited by examiner

IMAGE PROCESSING METHOD AND ELECTRONIC DEVICE THEREFOR

CROSS-REFERENCE TO RELATED APPLICATIONS

This application is a continuation of International Application No. PCT/KR2022/007168 filed on May 19, 2022, designating the United States, and claiming priority to Korean Patent Application No. 10-2021-0064993, filed May 20, 2021, in the Korean Intellectual Property Office, the disclosures of all of which are hereby incorporated by reference herein in their entireties.

BACKGROUND

Field

Various example embodiments relate to a technique of synthesizing high-resolution images using a camera capable of changing a field of view.

Description of Related Art

In recent years, the proliferation of electronic devices equipped with cameras, such as digital cameras, digital camcorders, or smartphones, is actively taking place. Such an electronic device equipped with camera provide an image capture function. For example, the electronic device can acquire an image from the camera, display a preview screen on the display based on the real-time acquired image, and store, when a capture input is received, the captured image obtained from the camera.

In addition, the electronic device can utilize a camera capable of mechanically adjusting an optical path to change a field of view (FOV). By changing the center of the FOV of the camera, the electronic device can acquire multiple images and then use these acquired images to synthesize a high-resolution image.

SUMMARY

On the other hand, when multiple images of partial regions among the entire regions are captured while changing the center of the field of view (FOV) of a camera with a narrow FOV, it is necessary to acquire a plurality of individual images where the boundary regions of each individual image overlap in order to perform image synthesis.

At this time, increasing the exposure time or capturing multiple times at each position to generate a high-resolution image may lead to a significant increase in the total image acquisition and synthesis time.

The example technical achieved is not limited to the technical problem mentioned above, and other technical problems not mentioned will be clearly understood by those skilled in the art to which the present disclosure belongs, from the description below.

In accordance with an example embodiment, an electronic device may include a camera, a display, and at least one processor electrically connected, directly or indirectly, to the camera and the display, wherein the at least one processor is configured to display an image acquired by driving the camera as a preview image on the display, determine a first region of the preview image to be a main region, acquire a plurality of images respectively corresponding to a plurality of fields of view (FOVs) in a predetermined sequence while changing the FOV of the camera, acquire a first image of the first region using the camera, and generate a result image based on the plurality of acquired images and the first image, and wherein at least a portion of the first image may overlap at least one of the plurality of images.

In accordance with an example embodiment, an operation method of an electronic device may include displaying an image acquired by driving a camera as a preview image on a display, determining a first region of the preview image to be a main region, acquiring a plurality of images respectively corresponding to a plurality of FOVs in a predetermined sequence while changing the FOV of the camera, acquiring a first image of the first region using the camera, and generating a result image based on the plurality of acquired images and the first image, wherein at least a portion of the first image may overlap at least one of the plurality of images.

In accordance with an example embodiment, an electronic device may include a camera, a display, and at least one processor electrically connected, directly or indirectly, to the camera and the display, wherein the at least one processor is configured to display an image acquired by driving the camera as a preview image on the display, determine whether there is a region where motion exists in the preview image, determine the region where the motion exists to be a first region when it is determined that there is the region where the motion exists in the preview image, determine a sequence for acquiring a plurality of images respectively corresponding to a plurality of FOVs while changing the FOV of the camera, acquire the plurality of images and a first image of the first region according to the determined sequence, and generate a result image based on the plurality of acquired images and the first image, and wherein at least a portion of the first image may overlap at least one of the plurality of images.

An electronic device and/or method in various example embodiments may additionally acquire an image of a main region to improve the quality of the image with a minimum or reduced capturing time.

BRIEF DESCRIPTION OF DRAWINGS

The above and other aspects, features and advantages of certain embodiments will be more apparent from the following detailed description, taken in conjunction with the accompanying drawings, in which.

In connection with the description of the drawings, the same or similar reference numerals may be used for the same or similar elements.

DETAILED DESCRIPTION

Figure 1:
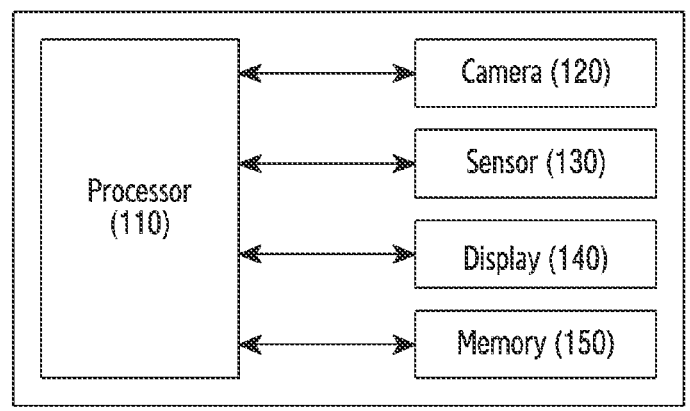
FIG. 1 is a block diagram of an electronic device according to an example embodiment.

FIG. 1 is a block diagram of an electronic device according to an embodiment.

Referring to FIG. 1, an electronic device 100 may include a processor 110, a camera 120, a sensor 130, a display 140, and a memory 150. In various embodiments, the electronic device 100 may include additional components in addition to the components shown in FIG. 1 or may omit at least one of the components shown in FIG. 1.

According to an embodiment, the processor 110 may execute operations or data processing related to control and/or communication of at least one other element of the electronic device 100 by using instructions stored in the memory 150. According to an embodiment, the processor 110 may include at least one of a central processing unit (CPU), a graphics processing unit (GPU), a microcontroller unit (MCU), a sensor hub, a supplementary processor, a communication processor, an application processor, an application-specific integrated circuit (ASIC), or field programmable gate arrays (FPGAs), and may have a plurality of cores.

According to an embodiment, the processor 110 may execute an application (e.g., a camera application) stored in the memory 150. According to an embodiment, the processor 110 may acquire an image using the camera 120 while the camera application is executed. An application described herein may be an arbitrary application using the camera 120.

According to an embodiment, the processor 110 may acquire a plurality of images respectively corresponding to a plurality of fields of view (FOVs) while changing the FOV of the camera 120. According to an embodiment, the processor 110 may determine (or change) a sequence for acquiring a plurality of images. According to an embodiment, the processor 110 may acquire a plurality of images of the same region using the camera 120.

According to an embodiment, the processor 110 may adjust an exposure value for acquiring an image of at least a partial region of a preview image, and acquire an image according to the adjusted exposure value. According to an embodiment, the processor 110 may determine a region where motion exists in the preview image and determine (or change) a sequence to acquire an image of the region where the motion exists.

According to an embodiment, the processor 110 may acquire (or capture) images (e.g., still images and moving images or videos) through the camera 120, and store, based on this, the images and information on the images in the memory 150. For example, the processor 110 may store brightness or motion information of the at least a partial region of the preview image in the memory 150. A detailed description related to the operation of the processor 110 will be made later with reference to FIG. 2.

According to an embodiment, the camera 120 may acquire (or capture) images (e.g., still images and moving images). For example, an image signal processor (not shown) electrically connected, directly or indirectly, to the camera 120 may distinguish between an object (e.g., a person) and a background included in an image (e.g., the preview image or the image stored in the memory 150). The image signal processor may extract feature points of the image (e.g., the preview image or the image included in the memory 150). According to an embodiment, the feature points may be used to identify (or recognize) an outer surface of the image. The image signal processor may be separate from the camera 120 or may be implemented as part of the processor 110. According to an embodiment, the camera 120 may include an image sensor. According to an embodiment, the image sensor may acquire and process color information.

According to an embodiment, the sensor 130 may include at least one of a depth sensor, a time-of-flight (ToF) sensor, a gyro sensor (or gyroscope), a gravity sensor, an acceleration sensor, a proximity sensor, or an illuminance sensor.

According to an embodiment, the depth sensor may measure the depth of an external object and generate depth information corresponding to the external object using the measured depth. According to an embodiment, the ToF sensor may generate distance information corresponding to the external object by measuring and calculating the time it takes for light to be emitted towards the external object and reflected back. According to various embodiments, the gyro sensor, the gravity sensor, the acceleration sensor, or a combination of two or more of these may perform the operations of the sensor 130 by detecting the rotation of the electronic device 100, a change in orientation of the electronic device 100, an inclination of the electronic device 100, or the like.

According to an embodiment, the illuminance sensor may measure external illuminance of the electronic device 100 using the intensity of light incident from the outside. According to an embodiment, the illuminance sensor may receive external light to measure (or identify) the illuminance of the environment in which the electronic device 100 is located.

According to an embodiment, the sensor 130 may be operatively connected, directly or indirectly, to the processor 110, the camera 120, the memory 150, and the like to process color information, 3D information, distance information, location information, and the like.

According to an embodiment, the display 140 may generate a driving signal by converting an image signal, a data signal, a control signal, and the like processed by the processor 110. According to an embodiment, the display 140 may be implemented as a plasma display panel (PDP), a liquid crystal display (LCD), an organic light emitting diode (OLED), a flexible display, etc., and may also be implemented as a three-dimensional (3d) display. According to an embodiment, the display 140 may be composed of a touch screen and may be used as an input device in addition to an output device.

The display 140 according to an embodiment may display an image acquired through the camera 120. According to an embodiment, the electronic device 100 may acquire a user's input (e.g., a touch input) through the display 140 and transmit the user's input to the processor 110. For example, the electronic device 100 may acquire a touch input on the display 140 for determining a first region (e.g., a main region) from which a plurality of images are acquired, and transmit the touch input to the processor 110.

According to an embodiment, the memory 150 may refer to one or more memory sets. According to an embodiment, the memory 150 may store data and/or commands received or generated from other components (e.g., the processor 110, the camera 120, the sensor 130, and the display 140). According to various embodiments, the memory 150 may store an application using the camera.

Figure 2:
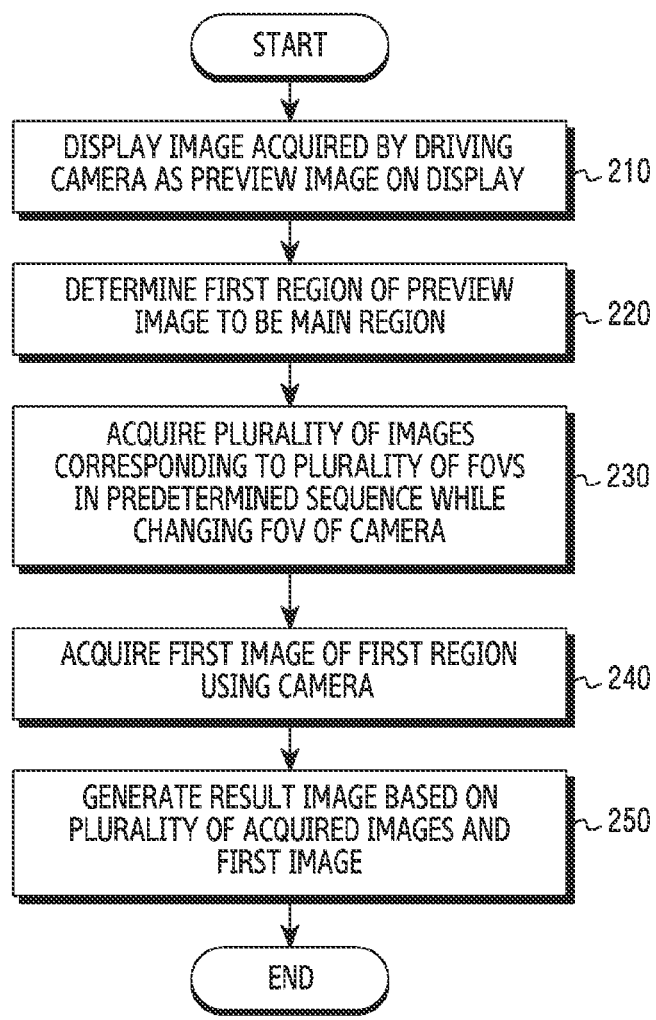
FIG. 2 is a flowchart illustrating an operation in which an electronic device according to an example embodiment acquires a plurality of images to generate a resulting image.

FIG. 2 is a flowchart illustrating an operation in which an electronic device according to an embodiment acquires a plurality of images to generate a result image.

Referring to FIG. 2, in operation 210, the processor 110 according to an embodiment may display an image acquired by driving a camera (e.g., the camera 120 of FIG. 1) as a preview image on a display (e.g., the display 140 of FIG. 1). According to an embodiment, the processor 110 may display the image acquired through the camera 120 as the preview image on the display 140 while a camera application stored in the memory 150 is executed. For example, the processor 110 may display an image corresponding to a field of view (FOV) of a wide camera on the display 140 as a preview image on the display 140.

According to an embodiment, in operation 220, the processor 110 may determine a first region of the preview image to be a main region. According to an embodiment, while the preview image is displayed on the display 140, the processor 110 may determine the first region to be the main region based on a user input (e.g., a touch input) on the first region of the preview image.

According to an embodiment, the processor 110 may determine the first region of the preview image to be the main region based on a result of analyzing the preview image. According to an embodiment, the processor 110 may acquire depth information and/or distance information about at least one object included in the preview image using the sensor 130 (e.g., depth sensor or ToF sensor). According to an embodiment, the processor 110 may separate an object closest to the electronic device 100 from a background image based on the acquired depth information and/or distance information. According to an embodiment, the processor 110 may determine a region corresponding to the object closest to the electronic device 100 to be the main region.

According to an embodiment, the processor 110 may analyze the preview image to recognize a face included in the preview image, and determine the main region to include the recognized face based on the analysis result. According to an embodiment, the processor 110 may identify at least one face included in the preview image using artificial intelligence (AI), and determine the main region to include the identified face.

According to an embodiment, the processor 110 may analyze the preview image to determine whether there is a region where motion exists in the preview image. For example, the processor 110 may use at least one of a wide camera and a scan camera to determine whether there is the region where the motion exists in the preview image. According to an embodiment, when it is determined that there is the region where the motion exists in the preview image, the processor 110 may determine the first region in which the motion exists to be the main region.

According to an embodiment, in operation 230, the processor 110 may acquire a plurality of images respectively corresponding to a plurality of fields of view (FOVs) in a predetermined sequence while changing the FOV of the camera 120. For example, the processor 110 may acquire a plurality of images respectively corresponding to a plurality of FOVs while changing the FOV of a telecamera. According to an embodiment, the processor 110 may acquire two or more images of at least one region among the plurality of regions respectively corresponding to the plurality of FOVs while changing the FOV of the camera 120. According to an embodiment, the processor 110 may determine (or change) the sequence based on the fact that the first region of the preview image is determined to be the main region.

According to an embodiment, when it is determined that there is the first region where the motion exists in the preview image, the processor 110 may track the motion occurring in the preview image, and determine the sequence to acquire a first image of the first region when it is determined that the motion has decreased based on the tracking result. According to an embodiment, when it is determined that there is the first region where the motion exists in the preview image, the processor 110 may determine the sequence to acquire a plurality of images of the first region.

According to an embodiment, in operation 240, the processor 110 may acquire the first image of the first region using the camera 120. According to an embodiment, the processor 110 may acquire the plurality of images respectively corresponding to the plurality of FOVs in the predetermined sequence, and then additionally acquire the first image of the first region. According to an embodiment, the processor 110 may acquire a plurality of first images of the first region while acquiring the plurality of images respectively corresponding to the plurality of FOVs in the predetermined sequence. According to an embodiment, at least a partial region of the first image may overlap at least one of the plurality of images.

According to an embodiment, when it is determined that there is the first region where the motion exists in the preview image, the processor 110 may analyze the motion occurring in the preview image, and acquire an image of the first region according to the sequence determined according to the result obtained by analyzing the motion. For example, when it is determined that the motion has decreased according to the sequence determined based on the result obtained by tracking the motion occurring in the preview image, the processor 110 may acquire the first image of the first region. In addition, for example, the processor 110 may acquire the first image of the first region according to the sequence determined to acquire a plurality of images of the first region.

According to an embodiment, in operation 250, the processor 110 may generate a result image based on the plurality of acquired images and the first image. According to an embodiment, the processor 110 may generate the result image by synthesizing the plurality of images and the first image. According to an embodiment, the processor 110 may store the generated result image in the memory 150.

Figure 3A:
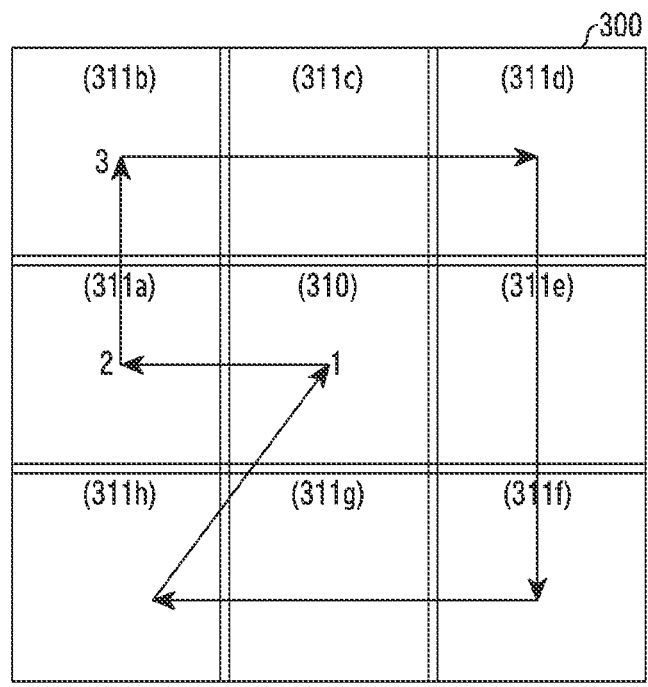
FIG. 3A is a diagram illustrating an operation in which an electronic device according to an example embodiment acquires a plurality of images respectively corresponding to a plurality of fields of view (FOVs) and additionally acquires an image of a central region.

FIG. 3A is a diagram illustrating an electronic device according to an embodiment acquires a plurality of images respectively corresponding to a plurality of FOVs and additionally acquires an image of a central region.

Referring to FIG. 3A, the processor 110 according to an embodiment may determine a region corresponding to a central region of a preview image 300 displayed on the display 140 to be a main region 310, and determine the remaining region except for the main region 310 to be a sub-region 311.

According to an embodiment, the processor 110 may acquire an image corresponding to the main region 310 and an image corresponding to the sub-region 311 according to a predetermined sequence while changing the FOV of the camera 120. For example, the processor 110 may determine the central region of the preview image 300 to be the main region 310, acquire an image of the main region 310, and then sequentially acquire images of a first sub-region 311*a*, a second sub-region 311*b*, a third sub-region 311*c*, a fourth sub-region 311*d*, a fifth sub-region 311*e*, a sixth sub-region 311*f*, a seventh sub-region 311*g*, and an eighth sub-region 311*h*. In addition, for example, the processor 110 may acquire a plurality of images of the main region 310, and then acquire images of the sub-region 311 according to the predetermined sequence. According to an embodiment, a partial region of each of the plurality of images may overlap at least one other image.

According to an embodiment, the processor 110 may synthesize a result image corresponding to the entire preview image 300 using the plurality of images acquired for the main region 310 and the sub-region 311.

Figure 3B:
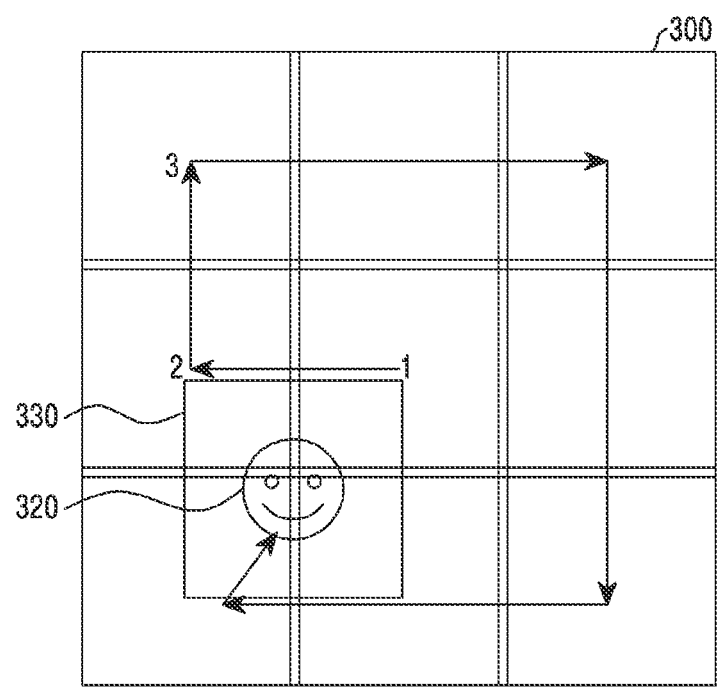
FIG. 3B is a diagram illustrating an operation in which an electronic device according to an example embodiment acquires a plurality of images respectively corresponding to a plurality of FOVs and additionally acquires an image corresponding to a primary object.

FIG. 3B is a diagram illustrating an operation in which an electronic device according to an embodiment acquires a plurality of images respectively corresponding to a plurality of FOVs and additionally acquires an image corresponding to a primary object.

Referring to FIG. 3B, the processor 110 according to an embodiment may analyze the preview image 300 displayed on the display 140. According to an embodiment, the processor 110 may determine at least one main object 320 included in the preview image 300 based on the result of analyzing the preview image 300. For example, the processor 110 may determine the at least one main object 320 included in the preview image 300 based on information acquired through the sensor 130 or information acquired using AI.

According to an embodiment, the processor 110 may determine a first region 330 to include the determined main object 320. According to an embodiment, the processor 110 may acquire a plurality of images including an image corresponding to the first region 330 and an image corresponding to a region except for the first region 330 according to a predetermined sequence while changing the FOV of the camera 120. According to an embodiment, a partial region of each of the plurality of images may overlap at least one other image.

According to an embodiment, the processor 110 may acquire an image of the entire region of the preview image 300 while changing the center of the FOV of the camera 120 according to the predetermined sequence, and then additionally acquire at least one image of the first region 330. According to an embodiment, the processor 110 may acquire a plurality of images of the first region 330 while acquiring a plurality of images respectively corresponding to a plurality of FOVs according to the predetermined sequence.

According to an embodiment, the processor 110 may synthesize a result image corresponding to the entire preview image 300 using the image acquired for the first region 330 including the main object 320 and the plurality of images acquired for the region except for the first region 330.

As described above, the electronic device 100 may acquire a plurality of images for the main region 310 corresponding to the central portion of the preview image 300 or for the region including the main object 320, thereby improving the image quality.

Figure 4A:
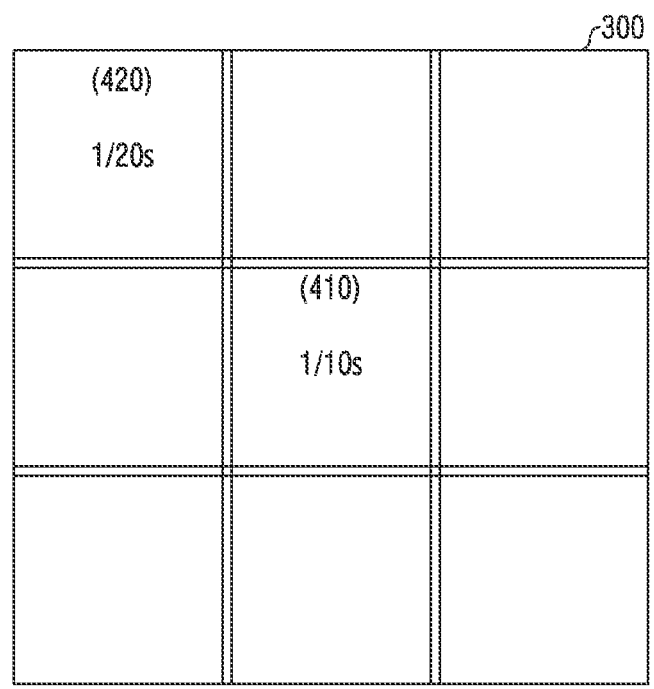
FIG. 4A is a diagram illustrating an operation in which an electronic device according to an example embodiment acquires an image by applying a different exposure value to a main region and a region other than the main region.

FIG. 4A is a diagram illustrating an operation in which an electronic device according to an embodiment acquires an image by applying a different exposure value to a main region and a region other than the main region.

Referring to FIG. 4A, the processor 110 according to an embodiment may determine a region corresponding to the central portion of the preview image 300 displayed on the display 140 to be a first region 410, and determine a region not corresponding to the central portion to be a second region 420. According to an embodiment, the processor 110 may analyze the preview image 300, determine at least one main object included in the preview image 300, determine a region including the determined main object to be the first region 410, and determine a region not including the main object to be the second region 420.

According to an embodiment, the processor 110 may measure external illuminance of the electronic device 100 using the sensor 130 (e.g., an illuminance sensor). According to an embodiment, when it is determined that the external illuminance of the electronic device 100 measured using the sensor 130 is equal to or less than predetermined illuminance, the processor 110 may determine different exposure time for the first region 410 and the second region 420.

According to an embodiment, even when the external illuminance of the electronic device 100 measured using the sensor 130 exceeds the predetermined illuminance, the processor 110 may determine different exposure times for the first region 410 and the second region 420.

According to an embodiment, the processor 110 may determine different capturing parameters for the first region 410 and the second region 420. For example, the capturing parameters may include at least one of a shutter speed, an aperture value, and a sensor gain.

According to an embodiment, the processor 110 may acquire an image of each region by applying the different exposure times to the first region 410 and the second region 420. According to an embodiment, the processor 110 may capture the image of the first region 410 using a first exposure time and the image of the second region 420 using a second exposure time. According to an embodiment, the processor 110 may acquire the image of the first region 410 by applying a first sensor gain to the first region 410 and the image of the second region 420 by applying a second sensor gain greater than the first sensor gain to the second region 420.

According to an embodiment, while changing the FOV of the camera 120 according to a predetermined sequence, the processor 110 may capture the first region 410 using the first exposure time, and capture the second region 420 using the second exposure time. According to an embodiment, the processor 110 may capture a plurality of images respectively corresponding to a plurality of FOVs by applying the second exposure time while changing the FOV of the camera 120 according to the predetermined sequence, and capture, in the order of acquiring the image of the first region 410, the corresponding image by changing the second exposure time to the first exposure time.

According to an embodiment, the processor 110 may generate a result image corresponding to the entire preview image 300 based on the image acquired for each of the first region 410 and the second region 420. According to an embodiment, the processor 110 may store the result image generated based on the image of each of the first region 410 and the second region 420 in the memory 150.

Figure 4B:
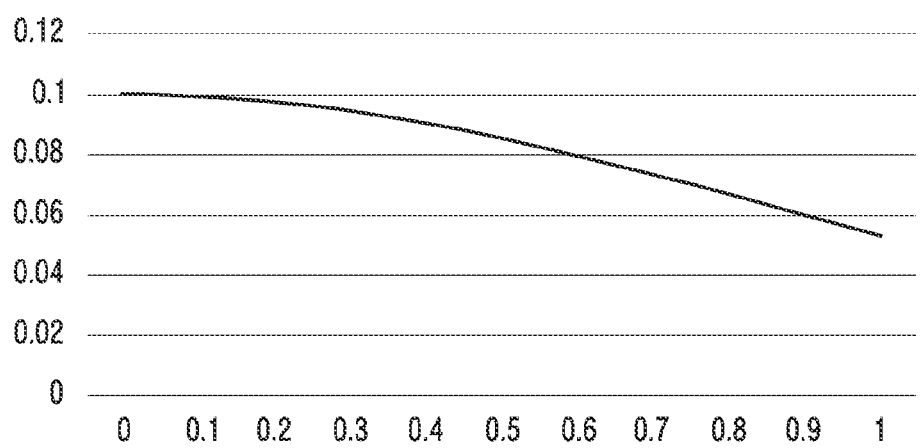
FIG. 4B is a diagram illustrating an operation in which an electronic device according to an example embodiment configures an exposure time to be changed according to a distance from the center of a preview image.
Figure 4B:
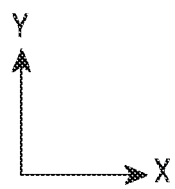

FIG. 4B is a diagram illustrating an operation in which an electronic device according to an embodiment configures an exposure time to be changed according to a distance from the center of a preview image.

Referring to FIG. 4B, the X axis represents a relative distance from the center of a preview image (e.g., the preview image 300 of FIG. 4A), and the Y axis represents an exposure time according to the relative distance from the center.

According to an embodiment, the processor 110 may acquire an image by applying a first exposure time to a first region separated from the center of the preview image 300 by a first distance. According to an embodiment, the processor 110 may acquire an image by applying a second exposure time shorter than the first exposure time to a second region separated from the center of the preview image by a second distance greater than the first distance.

According to an embodiment, the processor 110 may acquire a plurality of images respectively corresponding to a plurality of FOVs while changing the FOV of the camera 120 according to a predetermined sequence. In this case, the plurality of images respectively corresponding to the plurality of FOVs may be captured using different exposure times according to a distance from the center of the preview image 300.

According to an embodiment, the processor 110 may generate a result image by synthesizing the plurality of acquired images. For example, the processor 110 may generate a result image corresponding to the entire preview image 300 by synthesizing the plurality of images to which different exposure times are applied. According to an embodiment, the processor 110 may store, in the memory 150, the result image generated based on the plurality of images to which the different exposure times are applied.

Figure 5A:
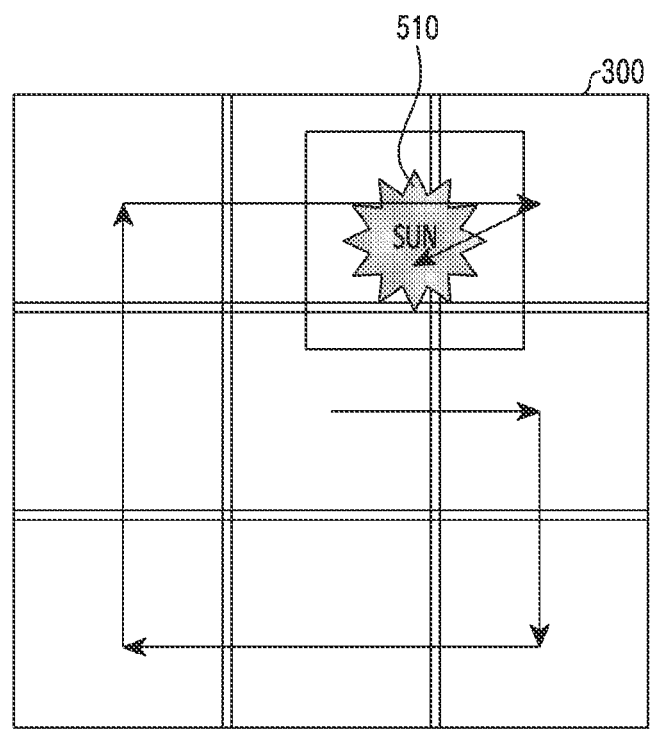
FIG. 5A is a diagram illustrating an operation in which an electronic device according to an example embodiment additionally acquires an image to synthesize an HDR image when it is determined that there is an overexposure.
Figure 5B:
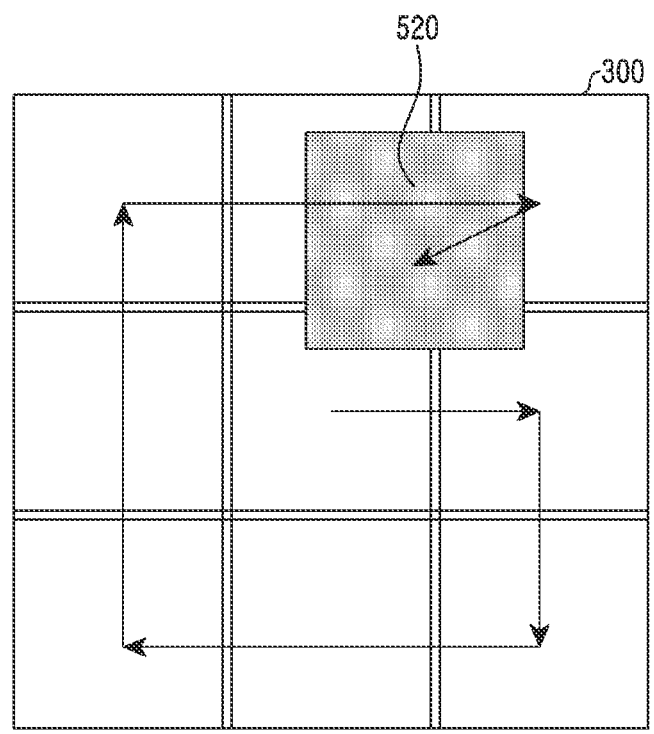
FIG. 5B is a diagram illustrating an operation in which an electronic device according to an example embodiment additionally acquires an image to synthesize an HDR image when it is determined that there is an underexposure.

FIG. 5A is a diagram illustrating an operation in which an electronic device according to an embodiment additionally acquires an image to synthesize an HDR image when it is determined that there is an overexposure. FIG. 5B is a diagram illustrating an operation in which an electronic device according to an embodiment additionally acquires an image to synthesize an HDR image when it is determined that there is an underexposure.

Referring to FIG. 5A, the processor 110 according to an embodiment may determine a region with an overexposure in the preview image 300 to be a first region 510. According to an embodiment, the processor 110 may acquire a second image having an exposure value different from a first exposure value configured for the preview image 300 with respect to the determined first region 510. According to an embodiment, the processor 110 may generate a high dynamic range (HDR) image using the second image.

According to an embodiment, when it is determined that there is the overexposure in the preview image 300 obtained using the first exposure value, the processor 110 may determine the region with the overexposure to be the first region 510. According to an embodiment, the processor 110 may acquire the second image by applying a second exposure value smaller than the first exposure value to the determined first region 510. According to an embodiment, the processor 110 may generate an HDR image by synthesizing the second image obtained using the second exposure value.

Referring to FIG. 5B, the processor 110 according to an embodiment may determine a region with an overexposure in the preview image 300 to be a first region 520. According to an embodiment, the processor 110 may acquire a second image having an exposure value different from the first exposure value configured for the preview image 300 with respect to the determined first region 520. According to an embodiment, the processor 110 may generate an HDR image using the second image.

According to an embodiment, when it is determined that there is an underexposure in the preview image 300 acquired using the first exposure value, the processor 110 may determine a region with the underexposure to be the first region 520. According to an embodiment, the processor 110 may acquire the second image by applying a second exposure value greater than the first exposure value to the determined first region 520. According to an embodiment, the processor 110 may generate an HDR image by synthesizing the second image obtained using the second exposure value.

According to an embodiment, while changing the FOV of the camera 120 according to a predetermined sequence, the processor 110 may acquire a plurality of images respectively corresponding to a plurality of regions except for the first regions 510 and 520 by applying the first exposure value. According to an embodiment, in the order of capturing the first regions 510 and 520, the processor 110 may acquire images corresponding to the first regions 510 and 520 by applying the second exposure value different from the first exposure value.

According to an embodiment, the processor 110 may generate an HDR image corresponding to the entire preview image 300 based on the images acquired for the first regions 510 and 520 and the remaining regions except for the first regions 510 and 520. According to an embodiment, the processor 110 may store, in the memory 150, the HDR image obtained by synthesizing the images obtained for the first regions 510 and 520 and the images obtained for the remaining regions except for the first regions 510 and 520.

Figure 6:
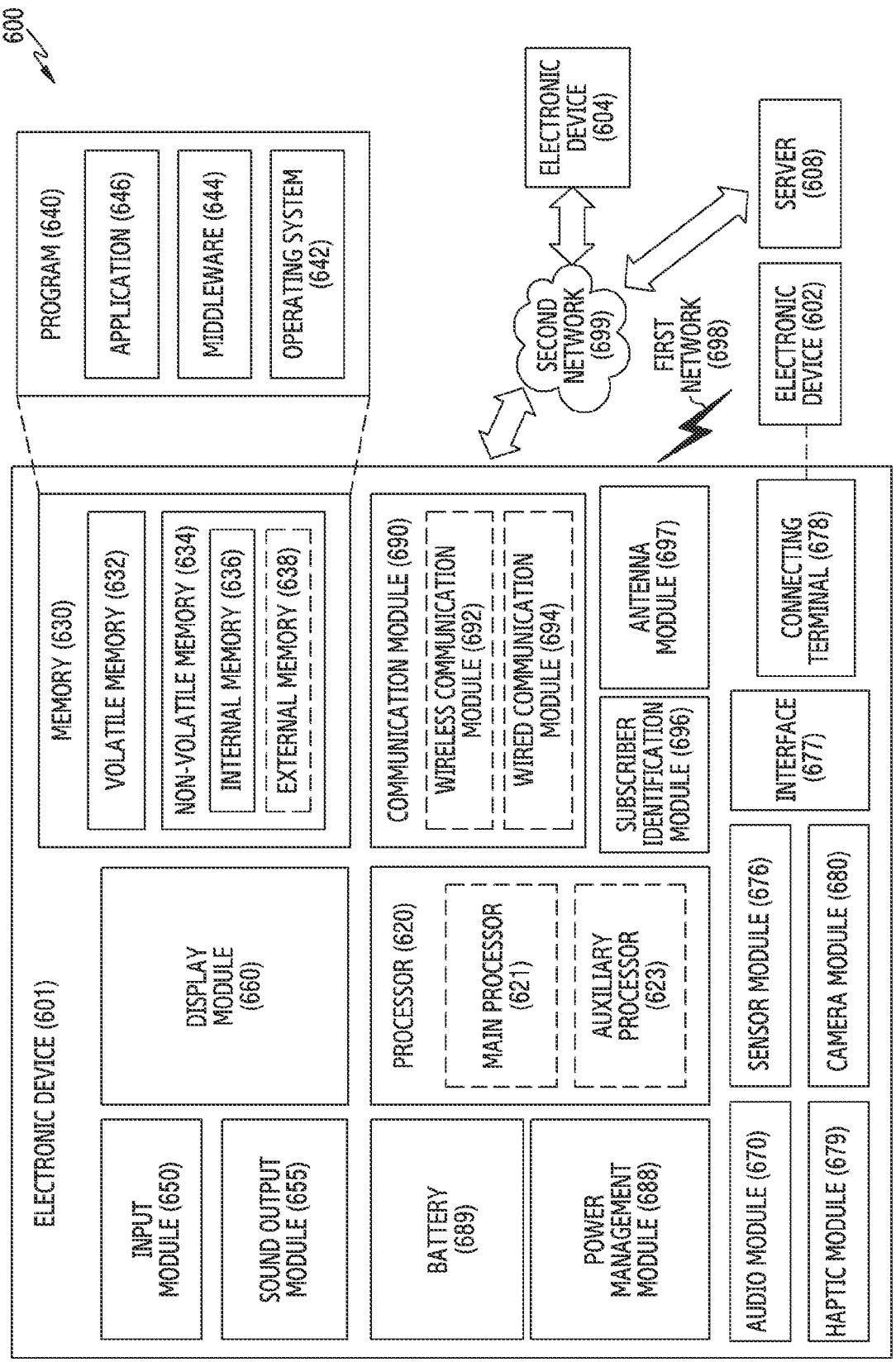
FIG. 6 is a block diagram illustrating an electronic device in a network environment according to an example embodiment.

FIG. 6 is a block diagram illustrating an electronic device 601 in a network environment 600 according to various embodiments.

Referring to FIG. 6, the electronic device 601 in the network environment 600 may communicate with an electronic device 602 via a first network 698 (e.g., a short-range wireless communication network), or at least one of an electronic device 604 or a server 608 via a second network 699 (e.g., a long-range wireless communication network). According to an embodiment, the electronic device 601 may communicate with the electronic device 604 via the server 608. According to an embodiment, the electronic device 601 may include a processor 620, memory 630, an input module 650, a sound output module 655, a display module 660, an audio module 670, a sensor module 676, an interface 677, a connecting terminal 678, a haptic module 679, a camera module 680, a power management module 688, a battery 689, a communication module 690, a subscriber identification module (SIM) 696, or an antenna module 697. In some embodiments, at least one of the components (e.g., the connecting terminal 678) may be omitted from the electronic device 601, or one or more other components may be added in the electronic device 601. In some embodiments, some of the components (e.g., the sensor module 676, the camera module 680, or the antenna module 697) may be implemented as a single component (e.g., the display module 660).

The processor 620 may execute, for example, software (e.g., a program 640) to control at least one other component (e.g., a hardware or software component) of the electronic device 601 coupled with the processor 620, and may perform various data processing or computation. According to an embodiment, as at least part of the data processing or computation, the processor 620 may store a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), or an auxiliary processor 623 (e.g., a graphics processing unit (GPU), a neural processing unit (NPU), an image signal processor (ISP), a sensor hub processor, or a communication processor (CP)) that is operable independently from, or in conjunction with, the main processor 621. For example, when the electronic device 601 includes the main processor 621 and the auxiliary processor 623, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display module 660 comprising a display, the sensor module 676 comprising a sensor, or the communication module 690 comprising communication circuitry) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 comprising a camera, or the communication module 690) functionally related to the auxiliary processor 623. According to an embodiment, the auxiliary processor 623 (e.g., the neural processing unit) may include a hardware structure specified for artificial intelligence model processing. An artificial intelligence model may be generated by machine learning. Such learning may be performed, e.g., by the electronic device 601 where the artificial intelligence is performed or via a separate server (e.g., the server 608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 630 may store various data used by at least one component (e.g., the processor 620 or the sensor module 676) of the electronic device 601. The various data may include, for example, software (e.g., the program 640) and input data or output data for a command related thererto. The memory 630 may include the volatile memory 632 or the non-volatile memory 634.

The program 640 may be stored in the memory 630 as software, and may include, for example, an operating system (OS) 642, middleware 644, or an application 646.

The input module 650 may receive a command or data to be used by another component (e.g., the processor 620) of the electronic device 601, from the outside (e.g., a user) of the electronic device 601. The input module 650 may include, for example, a microphone, a mouse, a keyboard, a key (e.g., a button), or a digital pen (e.g., a stylus pen).

The sound output module 655 may output sound signals to the outside of the electronic device 601. The sound output module 655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 660 may visually provide information to the outside (e.g., a user) of the electronic device 601. The display module 660 may include, for example, a display, a hologram device, or a projector and control circuitry to control a corresponding one of the display, hologram device, and projector. According to an embodiment, the display module 660 may include a touch sensor adapted to detect a touch, or a pressure sensor adapted to measure the intensity of force incurred by the touch.

The audio module 670 may convert a sound into an electrical signal and vice versa. According to an embodiment, the audio module 670 may obtain the sound via the input module 650, or output the sound via the sound output module 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to an embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, a SD card connector, or an audio connector (e.g., a headphone connector).

The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to an embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or infrared data association (IrDA)) or the second network 699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 692, comprising communication circuitry, may identify and authenticate the electronic device 601 in a communication network, such as the first network 698 or the second network 699, using subscriber information (e.g., international mobile subscriber identity (IMSI)) stored in the subscriber identification module 696.

The wireless communication module 692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 692 may support a high-frequency band (e.g., the mmWave band) to achieve, e.g., a high data transmission rate. The wireless communication module 692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 692 may support various requirements specified in the electronic device 601, an external electronic device (e.g., the electronic device 604), or a network system (e.g., the second network 699). According to an embodiment, the wireless communication module 692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 697 may transmit or receive a signal or power to or from the outside (e.g., the external electronic device) of the electronic device 601. According to an embodiment, the antenna module 697 may include an antenna including a radiating element composed of a conductive material or a conductive pattern formed in or on a substrate (e.g., a printed circuit board (PCB)). According to an embodiment, the antenna module 697 may include a plurality of antennas (e.g., array antennas). In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. According to an embodiment, another component (e.g., a radio frequency integrated circuit (RFIC)) other than the radiating element may be additionally formed as part of the antenna module 697.

According to various embodiments, the antenna module 697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 or 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, mobile edge computing (MEC), or client-server computing technology may be used, for example. The electronic device 601 may provide ultra low-latency services using, e.g., distributed computing or mobile edge computing. In another embodiment, the external electronic device 604 may include an internet-of-things (IoT) device. The server 608 may be an intelligent server using machine learning and/or a neural network. According to an embodiment, the external electronic device 604 or the server 608 may be included in the second network 699. The electronic device 601 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each module herein may comprise circuitry.

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 7:
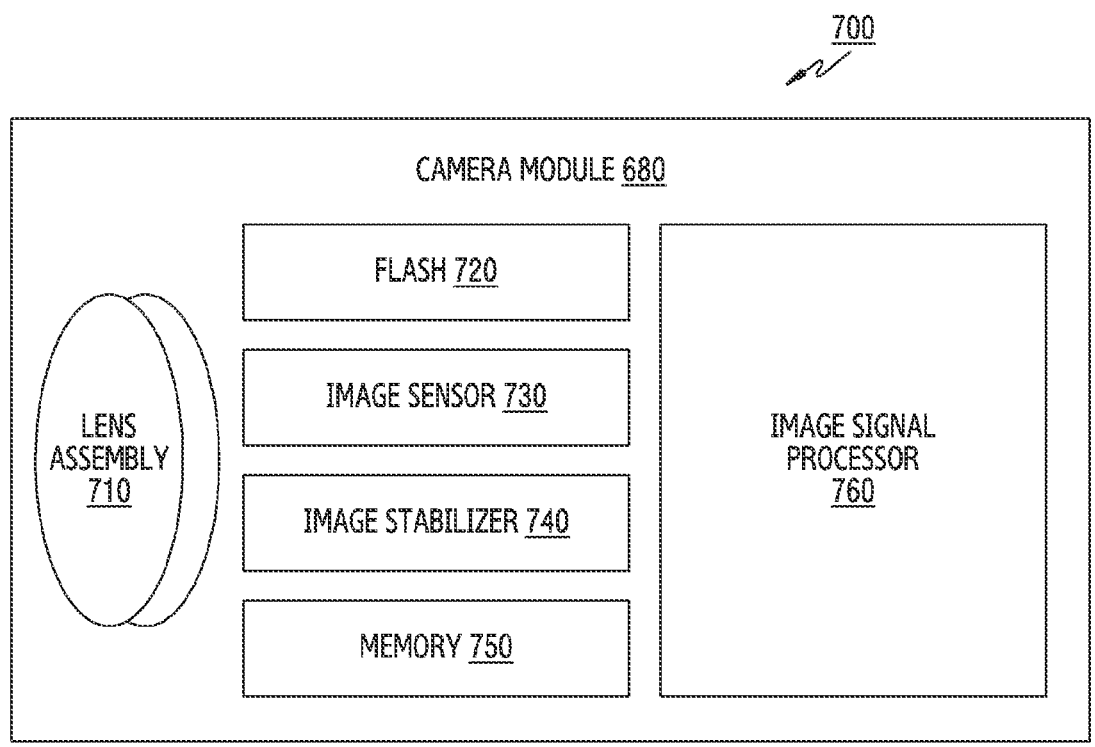
FIG. 7 is a block diagram illustrating a camera module according to an example embodiment.

FIG. 7 is a block diagram 700 illustrating the camera module 680 according to various embodiments.

Referring to FIG. 7, the camera module 680 may include a lens assembly 710, a flash 720, an image sensor 730, an image stabilizer 740, memory 750 (e.g., buffer memory), or an image signal processor 760. The lens assembly 710 may collect light emitted or reflected from an object whose image is to be taken. The lens assembly 710 may include one or more lenses. According to an embodiment, the camera module 680 may include a plurality of lens assemblies 710. In such a case, the camera module 680 may form, for example, a dual camera, a 360-degree camera, or a spherical camera. Some of the plurality of lens assemblies 710 may have the same lens attribute (e.g., view angle, focal length, auto-focusing, f number, or optical zoom), or at least one lens assembly may have one or more lens attributes different from those of another lens assembly. The lens assembly 710 may include, for example, a wide-angle lens or a telephoto lens.

The flash 720 may emit light that is used to reinforce light reflected from an object. According to an embodiment, the flash 720 may include one or more light emitting diodes (LEDs) (e.g., a red-green-blue (RGB) LED, a white LED, an infrared (IR) LED, or an ultraviolet (UV) LED) or a xenon lamp. The image sensor 730 may obtain an image corresponding to an object by converting light emitted or reflected from the object and transmitted via the lens assembly 710 into an electrical signal. According to an embodiment, the image sensor 730 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 730 may be implemented using, for example, a charged coupled device (CCD) sensor or a complementary metal oxide semiconductor (CMOS) sensor.

The image stabilizer 740 may move the image sensor 730 or at least one lens included in the lens assembly 710 in a particular direction, or control an operational attribute (e.g., adjust the read-out timing) of the image sensor 730 in response to the movement of the camera module 680 or the electronic device 601 including the camera module 680. This allows compensating for at least part of a negative effect (e.g., image blurring) by the movement on an image being captured. According to an embodiment, the image stabilizer 740 may sense such a movement by the camera module 680 or the electronic device 601 using a gyro sensor (not shown) or an acceleration sensor (not shown) disposed inside or outside the camera module 680. According to an embodiment, the image stabilizer 740 may be implemented, for example, as an optical image stabilizer. The memory 750 may store, at least temporarily, at least part of an image obtained via the image sensor 730 for a subsequent image processing task. For example, if image capturing is delayed due to shutter lag or multiple images are quickly captured, a raw image obtained (e.g., a Bayer-patterned image, a high-resolution image) may be stored in the memory 750, and its corresponding copy image (e.g., a low-resolution image) may be previewed via the display module 660. Thereafter, if a specified condition is met (e.g., by a user's input or system command), at least part of the raw image stored in the memory 750 may be obtained and processed, for example, by the image signal processor 760. According to an embodiment, the memory 750 may be configured as at least part of the memory 630 or as a separate memory that is operated independently from the memory 630.

The image signal processor 760 may perform one or more image processing with respect to an image obtained via the image sensor 730 or an image stored in the memory 750. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 760 may perform control (e.g., exposure time control or read-out timing control) with respect to at least one (e.g., the image sensor 730) of the components included in the camera module 680. An image processed by the image signal processor 760 may be stored back in the memory 750 for further processing, or may be provided to an external component (e.g., the memory 630, the display module 660, the electronic device 602, the electronic device 604, or the server 608) outside the camera module 680. According to an embodiment, the image signal processor 760 may be configured as at least part of the processor 620, or as a separate processor that is operated independently from the processor 620. If the image signal processor 760 is configured as a separate processor from the processor 620, at least one image processed by the image signal processor 760 may be displayed, by the processor 620, via the display module 660 as it is or after being further processed.

According to an embodiment, the electronic device 601 may include a plurality of camera modules 680 having different attributes or functions. In such a case, at least one of the plurality of camera modules 680 may form, for example, a wide-angle camera and at least another of the plurality of camera modules 680 may form a telephoto camera. Similarly, at least one of the plurality of camera modules 680 may form, for example, a front camera and at least another of the plurality of camera modules 680 may form a rear camera.

As described above, an electronic device according to an embodiment may include a camera (e.g., the camera 120 of FIG. 1), a display (e.g., the display 140 of FIG. 1), and at least one processor (the processor 110 of FIG. 1) electrically connected, directly or indirectly, to the camera and the display, wherein the at least one processor may display an image acquired by driving the camera as a preview image on the display, determine a first region of the preview image to be a main region, acquire a plurality of images respectively corresponding to a plurality of fields of view (FOVs) in a predetermined sequence while changing the FOV of the camera, acquire a first image of the first region using the camera, and generate a result image based on the plurality of acquired images and the first image, and wherein at least a portion of the first image may overlap at least one of the plurality of images.

According to an embodiment, the at least one processor may acquire a plurality of first images of the first region using the camera.

According to an embodiment, the electronic device may further include a sensor configured to measure external illuminance of the electronic device, wherein the at least one processor may adjust an exposure value for acquiring the first image when it is determined that the external illuminance of the electronic device is equal to or less than predetermined illuminance.

According to an embodiment, the at least one processor may determine the main region based on a touch input on the display.

According to an embodiment, the at least one processor may analyze the preview image to recognize a face included in the preview image, and determine the main region to include the recognized face based on the analysis result.

According to an embodiment, the at least one processor may determine a region with an overexposure or underexposure in the preview image to be the first region, acquire a second image having an exposure value different from a first exposure value configured for the preview image with respect to the determined first region, and generate a high dynamic range (HDR) image by synthesizing the second image.

According to an embodiment, when determining the region with the overexposure in the preview image to be the first region, the at least one processor may generate the HDR image by synthesizing the second image captured using a second exposure value smaller than the first exposure value with respect to the determined first region.

According to an embodiment, when determining the region with the underexposure in the preview image to be the first region, the at least one processor may generate the HDR image by synthesizing the second image captured using a second exposure value greater than the first exposure value with respect to the determined first region.

As described above, an operation method of an electronic device according to an embodiment may include displaying an image acquired by driving a camera (e.g., the camera 120 of FIG. 1) as a preview image on a display (e.g., the display 140 of FIG. 1), determining a first region of the preview image to be a main region, acquiring a plurality of images respectively corresponding to a plurality of FOVs in a predetermined sequence while changing the FOV of the camera, acquiring a first image of the first region using the camera, and generating a result image based on the plurality of acquired images and the first image, wherein at least a portion of the first image may overlap at least one of the plurality of images.

According to an embodiment, the operation method of the electronic device may include acquiring a plurality of first images of the first region using the camera.

According to an embodiment, the operation method of the electronic device may further include adjusting an exposure value for acquiring the first image when it is determined that external illuminance of the electronic device is equal to or less than predetermined illuminance, using a sensor configured to measure the external illuminance of the electronic device.

According to an embodiment, the determining of the main region may include determining the main region based on a touch input on the display.

According to an embodiment, the determining of the main region may include analyzing the preview image to recognize a face included in the preview image, and determining the main region to include the recognized face based on the analysis result.

According to an embodiment, the operation method of the electronic device may include determining a region with an overexposure or underexposure in the preview image to be the first region, acquiring a second image having an exposure value different from a first exposure value configured for the preview image with respect to the determined first region, and generating an HDR image by synthesizing the second image.

According to an embodiment, the operation method of the electronic device may include generating, when determining the region with the overexposure in the preview image to be the first region, the HDR image by synthesizing the second image captured using a second exposure value smaller than the first exposure value with respect to the determined first region.

As described above, an electronic device according to an embodiment may include a camera (e.g., the camera 120 of FIG. 1), a display (e.g., the display 140 of FIG. 1), and at least one processor electrically connected, directly or indirectly, to the camera and the display, wherein the at least one processor may display an image acquired by driving the camera as a preview image on the display, determine whether there is a region where motion exists in the preview image, determine the region where the motion exists to be a first region when it is determined that there is the region where the motion exists in the preview image, determine a sequence for acquiring a plurality of images respectively corresponding to a plurality of FOVs while changing the FOV of the camera, acquire the plurality of images and a first image of the first region according to the determined sequence, and generate a result image based on the plurality of acquired images and the first image, and wherein at least a portion of the first image may overlap at least one of the plurality of images.

According to an embodiment, the at least one processor may track the motion occurring in the preview image, and determine the sequence to acquire the first image of the first region when it is determined that the motion has decreased based on the tracking result. "Based on" as used herein covers based at least on.

According to an embodiment, the at least one processor may determine the sequence to acquire a plurality of first images of the first region using the camera.

According to an embodiment, a partial region of each of the plurality of images may be sequentially overlapped.

According to an embodiment, the at least one processor may use at least one of a wide camera and a scan camera to determine whether there is a region where motion exists in the preview image.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a camera;
a display; and
at least one processor;
memory storing instructions that, when executed by the at least one processor individually and/or collectively, cause the electronic device to:
control to display an image acquired at least by driving the camera as a preview image on the display;
determine at least one region with an overexposure or a region with an underexposure in the preview image to be a first region of the preview image;
acquire, using the camera, a plurality of images respectively corresponding to a plurality of fields of view (FOVs) in a predetermined sequence while changing the FOV of the camera;
acquire a first image of the first region using the camera;
acquire, using the camera, a second image having an exposure value different from a first exposure value configured for the preview image with respect to the determined first region; and
generate a result image based on the plurality of acquired images and the first image,
wherein at least a portion of the first image overlaps at least one of the plurality of images.

2. The electronic device of claim 1, wherein the instructions, when executed by the at least one processor further cause the electronic device to acquire a plurality of first images of the first region via the camera.

3. The electronic device of claim 1, further comprising a sensor configured to measure external illuminance of the electronic device,
wherein the instructions, when executed by the at least one processor further cause the electronic device to adjust an exposure value for acquiring the first image in case that it is determined that the external illuminance of the electronic device is equal to or less than predetermined illuminance.

4. The electronic device of claim 1, wherein the instructions, when executed by the at least one processor further cause the electronic device to determine the first region based on a touch input on the display.

5. The electronic device of claim 1, wherein the instructions, when executed by the at least one processor further cause the electronic device to analyze the preview image, recognize a face included in the preview image, and determine the first region to include the recognized face based on the analysis result.

6. The electronic device of claim 1, wherein the plurality of images correspond to the entire preview image, a plurality of first images of the first region are acquired, and the result image is generated based on the plurality of acquired images, the plurality of first images, and the second image.

7. The electronic device of claim 1, wherein the instructions, when executed by the at least one processor further cause the electronic device to, in a case of determining the region with the overexposure in the preview image to be the first region, generate an HDR image at least by synthesizing the second image captured using a second exposure value smaller than the first exposure value with respect to the determined first region.

8. The electronic device of claim 1, wherein the instructions, when executed by the at least one processor further cause the electronic device to, in a case of determining the region with the underexposure in the preview image to be the first region, generate an HDR image at least by synthesizing the second image captured using a second exposure value greater than the first exposure value with respect to the determined first region.

9. An operation method of an electronic device, the operation method comprising:
   displaying an image acquired at least by driving a camera as a preview image on a display;
   determining at least one region with an overexposure or a region with an underexposure in the preview image to be a first region of the preview image;
   acquiring, using the camera, a plurality of images respectively corresponding to a plurality of FOVs in a predetermined sequence based on changing the FOV of the camera;
   acquiring a first image of the first region using the camera;
   acquire, using the camera, a second image having an exposure value different from a first exposure value configured for the preview image with respect to the determined first region; and
   generating a result image based on the plurality of acquired images and the first image,
   wherein at least a portion of the first image overlaps at least one of the plurality of images.

10. The operation method of claim 9, further comprising acquiring a plurality of first images of the first region using the camera.

11. The operation method of claim 9, further comprising adjusting an exposure value for acquiring the first image in case that it is determined that external illuminance of the electronic device is equal to or less than predetermined illuminance, using at least a sensor configured to measure the external illuminance of the electronic device.

12. The operation method of claim 9, wherein the determining of the first region comprises determining the first region based on a touch input on the display.

13. The operation method of claim 9, wherein the determining of the first region comprises analyzing the preview image to recognize a face included in the preview image, and determining the first region to include the recognized face based on the analysis result.

14. The operation method of claim 9, wherein the plurality of images correspond to the entire preview image, a plurality of first images of the first region are acquired, and the result image is generated based on the plurality of acquired images, the plurality of first images, and the second image.

15. The operation method of claim 9, further comprising, in a case of determining the region with the overexposure in the preview image to be the first region, generating an HDR image by synthesizing the second image captured using a second exposure value smaller than the first exposure value with respect to the determined first region.

16. An electronic device comprising:
   a camera;
   a display; and
   at least one processor; memory storing instructions that, when executed by the at least one processor individually and/or collectively, cause the electronic device to:
   control to display an image acquired at least by driving the camera as a preview image on the display;
   determine whether there is a region where motion exists in the preview image;
   determine the region where the motion exists to be a first region based on determining that there is the region where the motion exists in the preview image;
   determine, based on the motion in the preview image, a sequence for acquiring a plurality of images respectively corresponding to a plurality of FOVs while changing the FOV of the camera;
   acquire the plurality of images and a first image of the first region based on the determined sequence; and
   generate a result image based on the plurality of acquired images and the first image,
   wherein at least a portion of the first image overlaps at least one of the plurality of images.

17. The electronic device of claim 16, wherein instructions, when executed by the at least one processor further cause the electronic device to track the motion occurring in the preview image, and determine the sequence to acquire the first image of the first region when it is determined that the motion has decreased based on the tracking result.

18. The electronic device of claim 16, wherein the instructions, when executed by the processor further cause the electronic device to determine the sequence to acquire a plurality of first images of the first region using the camera.

19. The electronic device of claim 16, wherein a partial region of each of the plurality of images is sequentially overlapped.

20. The electronic device of claim 16, wherein the instructions, when executed by the processor further cause the electronic device to use at least one of a wide camera and a scan camera to determine whether there is a region where motion exists in the preview image.

* * * * *